(12) United States Patent
Shulgin et al.

(10) Patent No.: US 7,204,660 B2
(45) Date of Patent: Apr. 17, 2007

(54) HUMIC MINERAL REAGENT AND METHOD FOR THE PRODUCTION THEREOF, METHOD FOR REHABILITATING POLLUTED SOILS, METHOD FOR DETOXIFICATION OF WASTES OF EXTRACTED AND PROCESSED MINERAL PRODUCTS AND RECULTIVATING ROCK DUMPS AND TAILING STORAGES, METHOD FOR SEWAGE WATER TREATMENT AND METHOD FOR SLUDGE UTILISATION

(76) Inventors: Alexander Ivanovich Shulgin, Golubinskaya, d.25.korp.1, kv, 509, Moscow (RU) 117463; Anton Alexandrovich Shulgin, Karamzina, d.1,korp.3, kv 215, Moscow (RU) 117463

( * ) Notice: Subject to any disclaimer, the term of this patent is extended or adjusted under 35 U.S.C. 154(b) by 0 days.

(21) Appl. No.: 10/536,208

(22) PCT Filed: Jan. 27, 2003

(86) PCT No.: PCT/RU03/00018

§ 371 (c)(1),
(2), (4) Date: May 23, 2005

(87) PCT Pub. No.: WO2004/048310

PCT Pub. Date: Jun. 10, 2004

(65) Prior Publication Data

US 2006/0058566 A1    Mar. 16, 2006

(30) Foreign Application Priority Data

Nov. 27, 2002 (RU) .............................. 2002131896

(51) Int. Cl.
B09B 1/08   (2006.01)
B09B 3/00   (2006.01)
C07C 63/33  (2006.01)

(52) U.S. Cl. .................. 405/128.75; 502/437; 588/315
(58) Field of Classification Search ............. 405/128.1, 405/128.7, 128.75; 588/315; 502/437
See application file for complete search history.

(56) References Cited

U.S. PATENT DOCUMENTS 2,992,093 A * 7/1961 Burdick ......................... 71/24

| 3,398,186 A | 8/1968 | Schwartz |
| 3,770,411 A | 11/1973 | Chambers et al. |
| 4,319,041 A | 3/1982 | Goff |
| 4,459,149 A | 7/1984 | Moran et al. |
| 4,569,799 A * | 2/1986 | House ........................ 564/280 |
| 5,059,307 A | 10/1991 | Meyers et al. |
| 5,085,764 A * | 2/1992 | Meyers et al. ............. 208/404 |
| 5,169,534 A * | 12/1992 | Maddalone ................. 210/667 |
| 2003/0131641 A1 | 7/2003 | Shulgin |

FOREIGN PATENT DOCUMENTS

| RU | 2031095 | 3/1995 |
| RU | 2104988 | 2/1998 |
| RU | 2108859 | 4/1998 |
| RU | 2119735 | 10/1998 |
| RU | 2125039 | 1/1999 |
| RU | 2130004 | 5/1999 |
| SU | 605585 | 4/1978 |
| SU | 836005 | 6/1981 |
| WO | 9533702 | 12/1995 |
| WO | WO-9830076 A * | 1/1999 |

\* cited by examiner

*Primary Examiner*—John Kreck
(74) *Attorney, Agent, or Firm*—Theresa Fritz Camoriano; John M. Lenczyk; Camoriano and Associates

(57) ABSTRACT

The humic-mineral agent from naturally occurring carbon-series humites and caustobioliths comprises humic acids and salts thereof, naturally hydrated humic acids, hydrolyzed humic acids, hydrated and hydrolyzed humic-mineral and mineral complexes of parent carbon-series humites and caustobioliths chemically bound to the naturally hydrated humic acids. The method for preparing a humic-mineral agent comprises crushing and disintegrating of carbon-series humites and caustobioliths and mixing them with an alkali. The carbon-series humites and caustobioliths are crushed and disintegrated when their moisture content is close to the natural level at which humic acids are in a naturally hydrated state, hot water is added to the. Next an alkali is added thereto and the mixture is hydrolyzed till obtaining the end product having consistency from viscous-flow to plastic and the pH value of from 6.5 to 8. The method for detoxication of polluted soil. The method for detoxication of waste products of mining and processing useful minerals and for reclaiming waste piles and tailing pits, the method for sewage water treatment and the method for salvaging sewage sediment are carried into effect by using the humic-mineral agent mentioned before.

20 Claims, No Drawings

HUMIC MINERAL REAGENT AND METHOD FOR THE PRODUCTION THEREOF, METHOD FOR REHABILITATING POLLUTED SOILS, METHOD FOR DETOXIFICATION OF WASTES OF EXTRACTED AND PROCESSED MINERAL PRODUCTS AND RECULTIVATING ROCK DUMPS AND TAILING STORAGES, METHOD FOR SEWAGE WATER TREATMENT AND METHOD FOR SLUDGE UTILISATION

TECHNICAL FIELD

The present invention relates to production of coal-humic and peat-humic preparations, sorbents, flocculants, coagulants, meliorants, soil conditioners, fertilizers, as well as humic-mineral substances having surface-active, ion-exchange, chelating, complexing, and biologically active properties.

BACKGROUND ART

Known in the present state of the art is a composition humic-silicon sorbent comprising a mineral matrix and humic acids chemically bonded thereto (RU Pat. No 2108895 A).

However usability of said known sorbent is limited to only binding of ions of heavy metals. It is due to the fact that the sorbent producing processes are multi-stage ones comprising the steps of extracting, neutralizing, filtering, washing, drying, and calcining that the resultant sorbent has high cost, whereby its use is impracticable.

One more humic concentrate is known to comprise artificially (technically) hydrated humic acids, salts thereof, and mineral components chemically bound to humic acids (RU Patent No 2125039).

Said known humic concentrate is characterized but a low active principle concentration (not more that 15%) which is accounted for by an electrolysis method of its preparation and by its composition little or amenable to be controlled or practically uncontrolled which is predetermined by a complex and heterogeneous electrolyte composition and too complicated control of the electrolysis process. The humic concentrate appearing as a gel (having a minimum moisture content of 85%) features high stickiness, whereby it is extremely inconvenient to handle. In addition, said known concentrate has a relatively high cost due to complicated and power-consuming production processes thereof comprising crushing and disintegrating the original feedstock, i.e., humites and caustobioliths of carbon series, extracting, separation of a solid and liquid phases, and electrolysis of an alkaline solution which predefines a limited practical use of said concentrate.

Another method for producing humic preparations is known to comprise simultaneous coal crushing and mixing it with an alkaline solution, and separation of an extract after heating (RU Patent No 2130004 A).

Said known method is characterized by a great amount of waste products, since an aqueous extraction is in fact the end product, while treated coal is a waste product; restricted use of the resultant aqueous extract only as a biologically active preparation in farming practice; high consumption rate of an alkali or ash resulting from coal or wood burning. In the latter case the ash content is practically uncontrollable which affects adversely the composition and properties of the end product obtained.

Still one more method for producing humic fertilizers is known to comprise ultrafine disintegration of coals containing humic acids in a mixture with hydroxides of alkali metals, the starting mixture being preliminarily dried to a (RU Patent No 2104988 A).

However, a necessity for preliminary drying of said mixture of coal and hydroxides of alkali metals to a final moisture content of from 6 to 12 wt %, as well as a necessity for a ultrafine disintegration of the starting mixture result in high power consumption rate and low efficiency of the process. Besides, in the course of coal drying the humic acids and their derivatives contained in the coal are dehydrated, with the result said derivatives are rendered in a dormant state.

A subsequent alkaline hydrolysis of such substances involves use of a great amount of alkaline agents, in particular, hydroxides of alkali metals which make up 20 to 35% of the coal weight. The end product obtained contains a great proportion of alkali and has a high pH value which restricts its use only as a carrier or source of ammonium humates and/or humates of alkali metals, the spread of use of which as well as demand therefor are extremely low and are limited to the sphere of regulators (biostimulators) of growth and development of plants.

Of great importance is the fact that it is due to absence of requirements to starting coal, wherein depending on the genesis, conditions of occurrence in a seam and preceding geological history that the content of organic toxicants, such as benzpyrene, and of inorganic toxicants, e.g., ions of heavy metals, i.e., beryllium, arsenic, mercury, lead, may reach dangerous concentrations. The end product comprises virtually the same concentrations of the aforementioned toxicants and therefore becomes harmful for practical use.

Levels of soil contamination with inorganic (heavy metals) and organic (hydrocarbons of oil and of products thereof, polychlorinated and polycyclic compounds) ecotoxicants reach in some instances dangerous values, whereby the problems of sanitation (detoxication) of contaminated soils and territories.

A method for soil vermireclamation and decontamination from oil and products thereof (RU Patent No 2119735, IPC A01B 79/02, published Oct. 10, 1998, Bulletin No 28), comprising applying a vermicompost to contaminates soils.

However the known method suffers from high cost for vermicompost preparation and is of low efficiency for detoxication and decontamination of soils polluted with both oil products and heavy metals.

It is also known a method for reclaiming agricultural soils and land detoxication, including applying to said soil a humic substance in the form of water-soluble humic acids (RU Patent No 2031095 A).

However, detoxication of polluted soils according to said method is of low efficiency due to rapid washing of water-soluble humic acids our of soil and their decomposing under the effect of physical-and-chemical factors (too low or high pH values of polluted soils) and of microbiological ones. In addition, it is due to a high cost of water-soluble humic acids a complicated production process thereof that the method in question has found no practical use whatever.

A great amount of waste products results from routine work of industrial enterprises which when stocked in stockpiles, dump pits, slurry and tailing dumps are a dangerous source of pollution of the surrounding natural environment with toxic chemical elements and compounds making part of said waste products and resulting from processes of their storage.

A land reclamation method is known to comprise putting in dumps potentially fertile kinds of loess, clay and sand, followed by applying a humus-incorporated coat thereto (SU Patent No 605958).

The known method is characterized by high labor input and material consumption rate and fails to provide an efficient dump and pile detoxication.

A method for detoxication of waste materials of winning and processing useful minerals and reclaiming waste pile and tailing pits is known to comprise applying a detoxifier agent (e.g., lime) and mixing it with waste materials, and depositing a soil layer (cf. a textbook "Environmental protection during operation of tailing pits", by P. V. Beresnevich, P. K. Kuzmenko, and N. G. Nezhentseva, Moscow Nedra Publishers, 1933, pp. 102–107).

The known method is characterized by high consumption rate of detoxifier substances, high labor input, and lower efficiency.

One of the most dangerous sources of environmental pollution is sewage water of industrial, agricultural, and other productions.

A method for sewage water treatment from inorganic, organic, and microbiological impurities is known to comprise adding to water bactericidal and other agents, water sedimentation, and sediment withdrawal (cf. a textbook "Sewage water treatment and decontamination at small settlements", Leningrad, Stroiizdat, 1993, pp. 113, 121, 124 (in Russian).

Used as said agents are mineral coagulants (aluminum sulfate, ferric chloride, and others), organic flocculants (polyacrylamide and derivatives based thereon), as well as a variety of combinations of said coagulants and flocculants.

The method in question is characterized by a relatively high cost and toxicity of the agents used, formation of a great amount of sediments hardly amenable to dewatering, and dependence of the water treatment process efficiency on composition and concentration of pollutants and water temperature.

A method for sewage water treatment is known to comprise adding to water an agent in the form of a humic concentrate, water sedimentation, and sediment withdrawal (RU Patent No 2125039 A).

The method, however, failed to find practical use due to a complicated process for humic concentrate production and a high cost the agent itself.

Surrounding natural environment is badly polluted also with sewage sediments, including municipal sewage sediments (MSS) which comprise a great proportion of organic waste and biogenic elements (nitrogen, phosphorus) and thus are good fertilizers, On the other side, MSS contain a great amount of ions of heavy metals, hydrocarbons of oil and oil products, as well as polycyclic and polychlorinated organic compounds.

The problem of detoxication and ecologically safe salvaging of MSS is a very urgent one for many scores of years.

A method for salvaging sewage sediment is known to comprise its mixing with peat and mineral components and applying said mixture to the soil as an organoinorganic fertilizer (SU Patent No 836005).

However, ions of heavy metals contained in MSS are not bound but are free migrate into the environment, thus contaminating ground water and intoxicating crop production. Besides, use of MSS is possible only on a restricted amount and periodically, that is, once per several years, with the proviso that its use performed is under a continuous ecological monitoring and sanitary-epidemiological control.

One more method for sewage sediment salvaging is known to comprise adding a humic preparation thereto (RU Patent No 2125039, A).

However, said method sails to find widespread use due to a complicated production process and high cost thereof.

SUMMARY OF THE INVENTION

It is a specific object of the present invention to provide a novel end product having a composition and structure, and a method for its production from such a raw stock under such conditions and production modes that make possible producing a humic-mineral agent in production quantities without considerable power consumption and production time spent, at a small consumption rate of alkali used, said humic-mineral agent possessing sorbing, ion-exchanging, complexing, chelating, and biologically active properties, involving maximum use of a physical-and-chemical potential of the original stock, i.e., carbon-series humites and caustobioliths, namely, peat, brown coal, oxidized brown coal, and oxidized bituminous coal in a synergic unity of naturally hydrated and hydrolyzed humic acids, hydrated and hydrolyzed humic-mineral complexes and mineral components for establishing conditions for subsequent disclosure and intensification of positive properties concurrently with prevention of presence of dangerous concentrations of organic and inorganic toxicants with a view to efficient use thereof for sanitation of polluted soil, detoxication of waste materials of winning and processing useful minerals, and reclamation of waste piles and tailing pits, sewage water treatment and salvaging sediments.

Said object is accomplished due to the provision of a novel humic-mineral agent from naturally occurring carbon-series humites and caustobioliths, said agent comprising humic acids and salts thereof, naturally hydrated humic acids, hydrolyzed humic acids, hydrated and hydrolyzed humic-mineral and mineral complexes of parent carbon-series humites and caustobioliths chemically bound to said naturally hydrated humic acids.

It is due to all stated before that the novel humic-mineral agent features high sorptive, ion-exchanging, complexing, chelating, flocculating, coagulating and biological activity.

According to the present invention, the humic-mineral agent appears as the product prepared from natural carbon-series humites and caustobioliths, the components of which includes (on a weight percent basis):

| | |
|---|---|
| naturally hydrated humic acids | >25.0 |
| mineral components | <30.0 |
| volatiles | <40.0 |
| bulk and water-soluble forms of heavy metals, as well as benzpyrene whose content is below the maximum allowable concentration rates specified for soil. | |

Content of the main components specified before is determined by an original composition of peat and brown coal, oxidized brown coal or oxidized bituminous coal whose content of naturally hydrated humic acids must be at least 25%, maximum ash content −30%, and maximum yield of volatiles −40%. The content of bulk and mobile forms of heavy metals and of benzpyrene controllable at present should not exceed the level of established for soils maximum allowable concentrations, since a principle purpose of the humic-mineral agent includes soil detoxication and treatment, as well as reclamation of disturbed lands, industrial dumps and spoil areas.

According to the herein-proposed invention, the humic-mineral agent may be prepared by hydrating carbon-series humites and caustobioliths by their mixing with water, and alkaline hydrolysis of said humites and caustobioliths, the content of which ranges from 40 to about 50% in terms of dry matter, alkali content of from 1 to about 7.5% in terms of dry matter, water being the balance, wherein hydration and hydrolysis are conducted until the end product acquires the consistency of from viscous-flow to plastic and the pH value becomes from 6.5 to 8.

High efficiency of the humic-mineral agent as a high sorptive, ion-exchanging, complexing, chelating, flocculating, coagulating and biological active material is due to the fact that the molecules of humic acids therein are in a naturally hydrated state where part of the acid groups thereof are dissociated, and in a hydrolyzed state where they become water-soluble compounds. In this case, hydrated and hydrolyzed humic-mineral and mineral complexes featuring high specific surface energy and surface-active properties synergetically intensifies the effects of said humic acids which in combination establishes a high physical-and-chemical and chemical activity potential of the humic-mineral agent which in turn determines economically useful properties thereof. Said fact is represented in the characteristics of the humic-mineral agent by a combination of naturally hydrated humic acids and hydrated and hydrolyzed humic-mineral and mineral components having the pH value lying in the limits safe for biological objects with predetermined solid-to-liquid ratio.

Hydrated humic acids of the humic concentrate are represented by low-molecular fragments of the humic acids of the parent carbon-series humites and caustobioliths, since when being extracted with an alkaline agent humic acids are rendered into water-soluble salts, whereupon they are isolated from a solution of the salts thereof by way of electrolysis.

Molecules having a molar weight of 27000 da (67% of a total molar content).

Naturally hydrated humic acids of the humic-mineral agent are represented by naturally occurring high-molecular having a molar weight of from 150000 da to a few millions of daltons. Part of the functional groups thereof is in a dissociated state and unlike naturally hydrated humic acids of the humic-mineral agent the degree of their dissociation may increase considerably, that is, reactivity of said acids may rise with time which is of importance for their practical use.

Unlike the hydrated acids of the humic concentrate, naturally hydrated humic acids are less mobile and soluble (which is a positive factor for attaining the object of the present invention in sanitation of polluted soil and detoxication of waste materials, since washing out of humic acids with atmospheric precipitation and ground water is reduced drastically).

Naturally hydrated humic acids have a greater affinity for soil microflora than hydrated humic acids and render a positive effect on growth, activity and stability thereof.

Naturally hydrated humic acids are less liable to various changes under the effect physical-and-chemical factors, such as solar (UV) radiation, alternating moistening and drying, as well as action of alkaline and acid agents and microbiological destruction.

Hydrolyzed humic acids of the humic-mineral agent are represented by fragments of naturally hydrated humic acids having a molar weight of from 1500 to 150000 da. In the event of alkaline hydrolysis with alkali deficiency there occurs substantially destruction of macromolecules of naturally hydrated humic acids and partially, formation of humates, i.e., salts of humic acids.

Hydrated and hydrolyzed humic-mineral and mineral complexes of the humic-mineral agent are represented by complicated heterogeneous activated systems comprising molecular, supermolecular, cluster, associative, colloidal, aggregate, macroaggregate structures capable of producing a synergic effect of displaying the properties of he humic and mineral portions of the humic-mineral agent.

Unlike the mineral components of the humic concentrate hydrated and hydrolyzed humic-mineral and mineral complexes of the humic-mineral agent have high adsorption and absorption activity, ability to complexing, ion exchange and chelation which adds to positive effects produced by the humic-mineral agent when in use.

Hydrated humic acids, salts of humic acids, and mineral components contained in the humic concentrate have but feeble physical-chemical interrelation with each other. On the other hand, naturally hydrated humic acids, hydrolyzed humic acids and salts of humic acids, hydrated and hydrolyzed humic-mineral and mineral complexes have strong physical-chemical and chemical bonds and mechanical linkages with one another which predetermines qualitatively other properties and functions of the humic-mineral agent which positively influence on accomplishing the principal objects of the present invention.

Said object of the invention is accomplished also due to the fact that in a method for preparing a humic-mineral agent comprising crushing and disintegrating of carbon-series humites and caustobioliths and mixing them with an alkali, according to the invention, said carbon-series humites and caustobioliths are crushed and disintegrated when their moisture content is close to the natural level at which humic acids are in a naturally hydrated state, hot water is added to said humites and caustobioliths and the mixture is hydrated under an intense physical-chemical action until a homogeneous mixture is obtained, whereupon an alkali is added thereto and the mixture is hydrolyzed till obtaining the end product having consistency from viscous-flow to plastic and the pH value of from 6.5 to 8.

It is just peat, brown coal, oxidized brown coal and oxidized bituminous coal that comprise a large amount of humic acids and are characterized by a low calorific power and high moisture content (20–45%). Such a high moisture content owes its origin to the presence of physically and chemically bound water as well as water in the sorbed state and that filling capillaries, pores, microfissures and macrocracks in peat and coal.

On account of their high natural moisture content peat and coal become sticky and when they are crushed and disintegrated by routine techniques this results in sticking of bins and chutes clogging of the crushing and disintegrating machines and devices. It is for said reason that, e.g., coal is dried to a moisture content of 11 to 13%, then crushed and disintegrated. However, during coal drying there are eliminated not only freely bound and sorbed water and water filling capillaries, pores and fissures but also occurs dehydration of humic acids and humic-mineral complexes. As a result, there happens coagulation of humic acids to form insoluble substances and their partial thermodestruction along with humic-mineral complexes. Such substances lose completely their activity and other positive properties so that their subsequent activation is practicable only in case of hydrolysis of great amounts of alkali within a prolonged period of time under an intense mechanical action at an elevated or high temperature (above 200° C.) and increased pressure.

Coal drying, reducing the content of freely bound water and rendering the coal less sticky, use of non-traditional crushing and disintegrating techniques based on use of vibrating mills, rotary disintegrators, and disk attritors provides for efficient crushing and disintegrating of the original feedstock which is as a rule of low strength and appearing largely as a dispersed mass. With such crushing and disintegration freely bound water, under the effect of capillary forces, surface tension forces and physical-chemical adsorption forces actively interact with humic acids and humic-mineral components, thus adding to the degree of their natural hydration which increases the amount of dissociated acid (functional) groups of humic acids which is characteristic of many bioorganic molecules.

Peat whose natural moisture content may exceed 45–50% is predried to a moisture content of about 35%. and then crushed. Disintegrated carbon-series humites and caustobioliths are added. under vigorous stirring, to water heated to 95 degrees Celsius. The weight of water for hydration of the humic acid-containing material (i.e. the humites and caustobioliths) is found from the following formula:

$$m_w = \frac{(W_d - W_o)m_y}{(1 - W_d)}$$

where $m_w$=weight of water for hydration
$m_y$=weight of natural sample having a moisture content between 0.20 and 0.45
$W_o$=measured moisture content of sample (between 0.20 and 0.45)
$W_d$=desired moisture content of between 0.5 and 0.6.

The maximum quantity of water is found by inserting the minimum value for the measured moisture content (0.2) and the maximum value for the desired moisture content (0.6):

$$m_w = \frac{(W_d - W_o)m_y}{(1 - W_d)} = \frac{(0.6 - 0.2)m_y}{(1 - 0.6)} = \frac{0.4 m_y}{0.4} = m_y$$

Thus, the maximum weight of water is equal to the weight of the sample.

The minimum quantity of water is found by inserting the maximum value for the measured moisture content (0.45) and the minimum value for the desired moisture content (0.5):

$$m_w = \frac{(W_d - W_o)m_y}{(1 - W_d)} = \frac{(0.5 - 0.45)m_y}{(1 - 0.5)} = \frac{0.05 m_y}{0.5} = 0.1 m_y$$

Thus, the minimum weight of water is equal to one-tenth the weight of the sample.

It is also expedient that the hydrated mixture be doped with a sodium or potassium alkali taken in an amount of from about 1 to about 7.5% (in terms of dry matter) of a total weight of dry matter of humite or caustobiolith, or an ammonia solution.

Besides, it is also expedient that a humic-mineral agent having consistency of from viscous-flow to plastic be doped with a nitrogen-bearing substance selected from the group consisting of ammonium nitrate and nitrophoska and being taken in an amount not exceeding 5% of humite or caustobiolith weight (in terms of dry matter).

Then disintegrated humite or caustobiolith is mixed with hot water by adding either of these to water rather than vice versa. Such a sequence of mixing said components is reasonable because gradually adding coal to water under vigorous physical-chemical effect (stirring, vibroacoustical treatment) results in a uniform water distribution over the bulk of coal. Conversely, adding water to coal leads to that part of the coal gets bound with water to form clots or lumps of various size which complicates badly coal treatment and homogenization of the mixture.

Said intense physical-chemical coal treatment with hot water causes further hydration of naturally hydrated humic acids contained therein. In the course of coal treatment there occurs maximum exposure of its principal components under the effect of wedging action of water arising during hydration of humic acids and swelling of mineral (clay) components, with the result that a homogenous coal-water mixture is formed.

An intense physical-chemical peat treatment results in its further disintegration.

Next, according to the invention, an alkali is added to the resultant homogeneous mixture under continuous vigorous physical-chemical action. As a result, the alkali enters into an intense chemical reaction with every coal component but first and foremost, with humic and humic-mineral ones.

Part of naturally hydrated humic acids interreacts with the alkali to form humates, i.e., salts of humic acids. In the case of sodium alkali, sodium humate is formed, when potassium alkali is used, potassium humate results, and with ammonium hydroxide, ammonium humate is obtained. All said humates are readily water-soluble and have a considerable biological potency.

Alkali likewise interacts with humic-mineral and mineral (clay) coal components. Upon interacting with humic-mineral complexes their partial destruction occurs yielding humic and mineral fractions. The humic fractions are vigorously hydrated and hydrolyzed to form humates. Under the effect of the alkali the mineral fractions, as well as the clay components are hydrolyzed and get swollen intensely, whereby their physical-chemical surface behavior, thus adding to the sorption, ion-exchange and coagulating effect thereof.

Presence of original naturally hydrated humic acids, as well as that of further hydrated humic acids, humic-mineral complexes and mineral (clay) particles results in that the amount of alkali spent for hydrolysis of humic acids, humic-mineral complexes and mineral (clay) components is minimized. For practically useful events a required reaction completeness is provided with an alkali consumption rate at which pH value of the end product obtained lies within 6.5 and 8.

With such an interaction the resultant humic-mineral agent acquires characteristic consistency ranging from viscous-flow to plastic, can readily be packaged, conveyed and used.

Said object is accomplished also in a method for detoxication of polluted soil, comprising application thereto a humic substance, wherein, according to the invention, used as said humic substance is a humic-mineral agent comprising humic acids and salts thereof, naturally hydrated humic acids, hydrolyzed humic acids, hydrated and hydrolyzed humic-mineral and mineral complexes of original carbon-series humites and caustobioliths chemically bound with said naturally hydrated humic acids, said humic-mineral agent being prepared by hydration of said carbon-series humites and caustobioliths upon mixing them with water and hydrolyzing with an alkali. According to the invention, the humic-mineral agent is applied to the soil by plowing or disking or loosening, in an amount of from about 0.1 to about 5% of the soil weight and is mixed together with the soil for a depth of the root-habitable layer.

Said object is accomplished also due to the fact that in a method for detoxication of waste products of mining and processing useful minerals and for reclaiming waste piles and tailing pits, comprising applying a detoxifier agent and mixing it with said waste products, according to the invention, used as said detoxifier agent is a humic-mineral agent comprising humic acids and salts thereof, naturally hydrated humic acids, hydrolyzed humic acids, hydrated and hydrolyzed humic-mineral and mineral complexes of original carbon-series humites and caustobioliths chemically bound with said naturally hydrated humic acids, said humic-mineral agent being prepared by hydration of said carbon-series humites and caustobioliths upon mixing them with water and hydrolyzing with an alkali. According to the invention, the humic-mineral agent is applied to the waste products in an amount of from about 0.1 to about 5% of the waste weight.

Said object is accomplished also due to the fact that in a method for sewage water treatment comprising applying to the water under treatment a humic substance, according to the invention, used as said humic acid is a humic-mineral agent comprising humic acids and salts thereof, naturally hydrated humic acids, hydrolyzed humic acids, hydrated and hydrolyzed humic-mineral and mineral complexes of original carbon-series humites and caustobioliths chemically bound with said naturally hydrated humic acids, said humic-mineral agent being prepared by hydration of said carbon-series humites and caustobioliths upon mixing them with water and hydrolyzing with an alkali. According to the invention, the humic-mineral agent is applied to the sewage water in an amount of from about 1 to about 7% of the water weight. Application of said humic-mineral agent to the water is expedient to be followed by adding lime thereto in an amount of from about 0.3 to 1.5% of the water weight.

Said object is accomplished also due to the fact that in a method for salvaging sewage sediment, comprising applying thereto and mixing therewith a humic preparation, according to the invention, used as said humic preparation is a humic-mineral agent comprising humic acids and salts thereof, naturally hydrated humic acids, hydrolyzed humic acids, hydrated and hydrolyzed humic-mineral and mineral complexes of original carbon-series humites and caustobioliths chemically bound with said naturally hydrated humic acids, said humic-mineral agent being prepared by hydration of said carbon-series humites and caustobioliths upon mixing them with water and hydrolyzing with an alkali. According to the invention, sewage sediment is used as reclaiming or isolating soil. Said humic-mineral agent is applied to sewage sediment in an amount of from about 0.1 to about 10% of the sediment weight.

BEST METHOD OF CARRYING OUT THE INVENTION

In what follows the essence of the present invention will now be disclosed in a detailed description of some specific embodiments thereof.

EXAMPLE 1

An original feedstock for preparing a humic-mineral agent is selected from the group consisting of brown coal, oxidized brown coal and oxidized bituminous coal mined at Borodinski, Beriozovski, Nazarovski opencast collieries of the Kansk-Achinsk coal field (Krasnoyarsk territory), at Maikubenski coal stripping (the Orenburg region), at Karatau coal deposit (Bashkortostan), Maritsa-Vostok coal deposit (Bulgaria), the Kuznetsk coal field, as well as peat extracted at the Shatura deposit (Moscow region). The feedstock selection criteria include the following experimentally found characteristics.

1. Total content of heavy metals and mobile forms thereof for which maximum allowable concentrations (MAC) in soil are established, because when the content of said metals of the original feedstock is not in excess of the corresponding MAC value, this assures their lower content in the humic-mineral agent produced from said feedstock, thereby precluding probable soil and land pollution when using the end product for detoxication, treatment and reclamation of polluted, disturbed and degraded soils and lands.

2. Yield of volatiles, bearing in mind that the lesser the yield thereof the lower the energy value of the coals involved and the higher their value as feedstock for preparing the humic-mineral agent. In addition, the lesser the volatile content the lower the content of bitumens and resines of the coal and the higher the humic-mineral agent efficiency for detoxication of polluted soils and decontamination of waste products.

3. Maximum content of naturally hydrated humic acids determinable against the yield of "free" humic acids as per USSR Standard GOST 9517-76 (by extracting with one-percent sodium hydroxide solution) at a high natural moisture content characteristic of brown coal and especially of oxidized brown coal and oxidized bituminous coal which predetermines, which in natural coal occurrence mode predetermines good ability of humic acids to be hydrated and high potential of interaction thereof with the alkaline agent.

4. Low ash content which to a great extent predetermines a strong bond between the mineral and organic coal components: the higher the ash content the stronger said bonds, and vice versa, the lower the ash content the lower the bond strength. Moreover, the lower the ash content and the bond strength the more efficiently occur hydration and hydrolysis of humic acids and humic-mineral complexes, that is, the better the properties and functions of the humic-mineral agent obtained.

A characteristic composition of test samples of oxidized brown coal from Borodinskii opencast colliery is presented below.

| | |
|---|---|
| Content of naturally hydrated humic acids | 75.9% |
| Ash content | 21.4% |
| Moisture content | 21.8% |
| Volatiles content | 28.6% |
| Total content of heavy metals: | |
| lead | 0.006 mg/kg |
| arsenic | 0.0003 mg/kg |
| Content of mobile forms of heavy metals: | |
| manganese | 0.01 mg/kg |
| Benzpyrene content | trace amounts |

With the original coal having natural moisture content, its bulk appears a loose earth-like mass and a small proportion, as lumps. Then said coal is passed through a hammer crusher. As a result of crushing, a maximum size of coal particles is not in excess of 3–5 mm. Once crushed the coal is disintegrated in a model ид-300 rotary disintegrator to a particle size below 0.1 mm. The pH value of the aqueous coal extract is 5,7.

Then samples are taken out from the bulk of disintegrated coal and hydrated with water heated to 95° C. under a vigorous vibroacoustic effect, and are hydrolyzed upon adding sodium alkali.

It is found that as soon as the coal reaches a moisture content of 50–60%, a practically homogeneous viscous-flow water-coal mixture is obtained. Upon adding an alkali thereto under intense stirring said homogeneous viscouis-flow mixture turns into a paste having a characteristic black luster.

It is also established that the weight of water required for coal hydration can be found from the following empirical formula:

$$m_w = \frac{(W_d - W_o)m_y}{(1 - W_d)}$$

where $m_w$=weight of water for hydration
$m_y$=weight of natural sample having a moisture content between 0.20 and 0.45
$W_o$=measured moisture content of sample (between 0.20 and 0.45)
$W_d$=desired moisture content of between 0.5 and 0.6.

Thus, for instance, hydration of a weighed coal dose of 10 kg with an original (natural) coal moisture content ($W_o$) of 21.8% requires 5.6 L to 9.5 L of water heated to 95 degrees Celsius. The low and high limits for the quantity of water were calculated by inserting the low and high values for the desired moisture content (0.5, 0.6) as follows:

$$m_w = \frac{(W_d - W_o)m_y}{(1 - W_d)} = \frac{(0.5 - 0.218)(10kg)}{(1 - 0.5)} = \frac{0.282(10kg)}{0.5} = 5.6kg = 5.6L$$

$$m_w = \frac{(W_d - W_o)m_y}{(1 - W_d)} = \frac{(0.6 - 0.218)(10kg)}{(1 - 0.5)} = \frac{0.382(10kg)}{0.4} = 9.5kg = 9.5L$$

When the amount of water is below 5.6 L, the resultant water-coal mixture is of an inadequately high quality, and the amount of water also should not exceed 9.5 L. The moisture content of the resultant humic-mineral agent should be from 50% to 60%, which means the dry matter content should be from 40% to 50%.

With the alkali content of 0.8% no characteristic homogeneous plastic paste is formed, and when the alkali content is as high as 2% the pH value of the mixture is as high as 8.5.

An optimum quantity of sodium alkali required for preparing paste-like consistency 28An optimum quantity of sodium alkali required for preparing paste-like consistency humic-mineral agent is 1.4% (in terms of dry weight) of a total dry weight of original coal. The pH value is therein equals to 7.4 and is liable to reduce to 6.6–6.8 when under storage.

EXAMPLE 2

A characteristic composition of test samples of brown coal from Nazarovskii opencast colliery is presented below.

| | |
|---|---|
| Content of naturally hydrated humic acids | 28.5% |
| Ash content | 12.6% |
| Moisture content | 26.8% |
| Volatiles content | 32.0% |
| Total content of heavy metals: | |
| lead | 0.003 mg/kg |
| the remainder | microquantity |
| Benzpyrene content | 0.0001 mg/kg. |

Original coal is predried by natural way on a drying area to a moisture content of about 21%, crushed in a hammer crusher to a particle size below 3 mm and disintegrated in a model ид-300 rotary disintegrator to a particle size below 0.1 mm. The pH value of the aqueous coal extract is 5.5.

Then samples are taken out from the bulk of disintegrated coal and hydrated with water heated to 95° C. under a vigorous mechanical effect.

A required amount of water is defined using the aforementioned formula. Hence. for instance, hydration of test coal samples 100 kg each having an original moisture content $W_o$=21% requires 58 L to 97.5 L of water heated to 95 degrees Celsius. The quantity of water is calculated as follows:

$$m_w = \frac{(W_d - W_o)m_y}{(1 - W_d)} = \frac{(0.5 - 0.21)(100kg)}{(1 - 0.5)} = \frac{0.29(100kg)}{0.5} = 58kg = 58L$$

$$m_w = \frac{(W_d - W_o)m_y}{(1 - W_d)} = \frac{(0.6 - 0.21)(100kg)}{(1 - 0.5)} = \frac{0.39(100kg)}{0.4} = 97.5kg = 97.5L$$

The water is poured into a reaction vessel to which a coal test sample is fed under vigorous mechanical and vibroacoustic effect. It is established that, with a resulting moisture content below 50%. the mixture comprise numerous clots which is indicative of a non-completeness of the hydration process and the presence of some untreated coal. With a resulting moisture content above 60%, the water-coal mixture becomes easy flowing which points to excess water. It is further found that with the humic-mineral agent moisture content of 50% to 60% a homogeneous viscous-flow water-coal mixture results. Upon adding potassium alkali under vigorous stirring said homogeneous viscous-flow mixture turns into a paste-like mass having a characteristic black luster. The amount of alkali is 2.1% in terms of dry matter of a total dry weight of original coal. The pH value is about 8. Once the alkali has been added to the mixture and the pH value been stabilized at about 8, the resultant mass is doped with a nitrogen-bearing agent, such as ammonium nitrate, carbamide. ammonium sulfate, or nitrophoska taken in an amount of up to 3–5% of coal dry weight. It is found that after adding the nitrogen-bearing substances the resultant paste gets thickened when under storage and the pH value thereof is reduced from 8 to about 7.2.

EXAMPLE 3

A characteristic composition of test samples of oxidized bituminous coal from Kuznetsk coal basin is presented below.

| | |
|---|---|
| Content of naturally hydrated humic acids | 79.3% |
| Ash content | 8.6% |
| Moisture content | 42.0% |
| Volatiles content | 31.0% |
| Total content of heavy metals: | |
| lead | 0.005 mg/kg |
| the remainder | microquantity |
| Content of water-soluble forms of heavy metals: | |
| manganese | 0.02 mg/kg |
| Benzpyrene content | trace amounts. |

Original coal appears as a dispersed granular mass colored black. Then coal is dried by natural way on a drying area till a moisture content of about 38% is attained, whereupon the coal is passed through a model ид-300 rotary disintegrator. Coal treatment in said rotary disintegrator performs for the most part a "check-up" function and assures the presence of particles not above 0.1 mm in size. The pH value of an aqueous extract is about 5.

Samples are taken out from the bulk of disintegrated coal and are hydrated with water heated to 95° C. and hydrolyzed with an alkali.

Thus, hydration of coal test samples weighing 100 kg each and having an original moisture content $W_o$ of about 38% requires 24 to 55 liters of water which is poured into a mixer, after which a coal test sample is charged thereto under vigorous stirring. It is established that with the humic-mineral agent moisture content of 50–60% a homogeneous viscous-flow water-coal mixture results. When the moisture content is below 50%, e.g., 45%, the mixture comprises unreacted rolled coal clots, and with the moisture content above 60%, e.g., 70%, the mixture becomes an easy-flowing one. Upon adding sodium or potassium alkali under vigorous stirring, said homogeneous viscous-flow mixture turns into a paste-like mass having a characteristic black luster.

An intense alkaline hydrolysis of the water-coal mixture begins with an alkali proportion of from 1% to about 7.5%. With the alkali percent below 1 no characteristic mixture "thickening", whereas with the alkali percentage above 7.5% an excess alkali appears, whereby the pH of the resultant humic-mineral agent increases drastically to exceed the pH value safe for biological objects.

An optimum amount of sodium alkali is about 3.8% in terms of dry matter of an original coal weight, that of potassium alkali, 4.4%. The pH value of the resultant paste is about 7.2.

When using ammonia water (i.e., ammonia solution with a 24% concentration) as an alkali, a paste-like mass with the pH value of about 8 is formed with a dose of about 7.5 liters (24% of the solution) which makes up about 7.5% of a total coal weight. The paste-like product thus obtained has a characteristic ammonia odor.

Coal hydrolysis using sodium or potassium alkali is followed by adding, under constant stirring, to the resultant desired product of paste-like consistency, a nitrogen-bearing agent, such as ammonium nitrate or carbamide or ammonium sulfate or nitrophoska. In all instances the end product is observed to get thickened and the pH value to lower from about 7.2 and to about 6.5.

EXAMPLE 4

Possibility of preparing the humic-mineral agent is assessed on a test sample of brown coal from "Maritsa-Vostok" coal deposit (Bulgaria). Due to deficiency of the test sample it is solely the content of naturally hydrated humic acids and the moisture content $W_o$ thereof that are determined to be 44.5% and 29%, respectively. Upon hydration with hot water and hydrolysis with sodium alkali a characteristic humic-mineral agent is obtained having a moisture content of 59% and pH value of 7.2.

EXAMPLE 5

Possibility of preparing the humic-mineral agent is assessed on test samples of peat from Shatura deposit. The content of naturally hydrated humic acids is 38%, that of total and mobile forms of heavy metals within the maximum allowable concentrate (MAC) standards for soil. The content of bitumen and wax, 8%, the original moisture content, 45%.

The peat samples are pre-dried to a moisture content of 35% and crushed to a particle size of 0.5–3 mm, whereupon the samples are charged into a reaction vessel and subjected to hydration and alkaline hydrolysis under vigorous stirring and vibroacoustic effect. It is found that as a result of such a treatment peat is efficiently dispersed first to form a well hydrated water-peat mixture and then humic-mineral agent having dense plastic consistency.

With a 40% peat content and a 6% alkali consumption rate the humic-mineral agent obtained has a 60% moisture content and the pH value of 7.8.

The herein-proposed novel product, that is, humic-mineral agent (hereinafter referred to as HMA) can be used to good advantage for solving a number of ecological engineering, industrial and agricultural problems.

It is thanks to the present invention that it becomes possible to carry out detoxication and decontamination of polluted and contaminated soil and lands and to dispense with the use of expensive chemical agents and materials.

To this end, the HMA taken in an amount of from about 0.1 to about 5% is applied to soil polluted with inorganic (salts of heavy metals) and organic ecotoxicants (hydrocarbons of oil and products thereof, polycyclic and polychlorinated organic compounds, and the like) is mixed with the soil for a depth of the root-inhabitable layer (as a rule 20 to 30 cm) or deeper (over 30 cm) by plowing, disking or loosening.

In this case, ions of heavy metals interact efficiently with humic acids and humates to form water-insoluble compounds. When bound heavy metals lose ability to migrate into ground water and plants. Concurrently there occurs adsorption of organic ecotoxicants by humic acids, humic-mineral and mineral (predominantly clay) components of the HMA.

Adsorption with humic acids and humic-mineral components runs a course of hydrophobic interaction and covalent binding and is followed by oxidation processes, i.e., hydroxylation of hydrocarbons, polychlorinated and polycyclic compounds inclusive.

Adsorption of organic ecotoxicants on the HMA mineral (clay) components occurs due to physical-chemical surface interaction mechanisms.

It is all mentioned before that transfers organic ecotoxicants from a relatively stable state into that amenable to microbiological destruction.

With considerable levels of soil pollution with inorganic and organic ecotoxicants microflora is in a suppressed state and therefore is but of low ability to exert influence on xenobiotics. Insofar as the principal MAC components are in fact organic soil components, that is, a habitat which is inhabited by soil microorganisms, hydrocarbon-oxidizing ones inclusive, well growing and developing therein, so applying the HMA to the soil provides conditions for enhancing activity of microorganisms. Hence the microorganisms while being sorbed on humic acids and humic-mineral components of the HMA, destroy actively organic compounds adsorbed on said acids and partially transform them into a specific soil organic substance, that is, humus.

Apart from detoxication of said ecotoxicants and of polluted soil, use of the HMA improves soil structure, adds to the exchange capacity of the soil absorbing complex and to soil moisture capacity, as well as increases fertility thereof.

For as much as the HMA may contain heavy metals or dangerous organic xenobiotics(e.g., benzpyrene) in quantities exceeding the established MAC standards, the use of the MAC for soil detoxication even in larger amounts is not causative of any negative secondary effects.

It is due to the proposed invention it becomes possible to efficiently carry out detoxication of waste products of production and processing of useful minerals and reclamation of rock spoil heaps and tailing pits.

To this aim, the HMA is added to waste products and mixed therewith for at least a depth of the root habitable layer (20–30 cm). When handling acidic waste, first the pH value is reduced from 2–3 to 6.5–8 with a detoxifier agent, then the HMA is added in an amount of from about 0.1 to about 10% of a total weight of waste in the root-habitable layer. In addition, seeds are sowed and plants are bedded not earlier than 7 days after the pH value of the waste has been restored and the HMA been applied.

The HMA binds cations of heavy metals to form water-soluble compounds, forms complexes with anions, sorbs organic and mineral substances, forms stable aggregates with argillous and argillous-arenacious minerals, contributes to aggregation of finely dispersed particles into agronomically valuable aggregates, increases moisture capacity, stimulates vital activities of soil microflora, and improves growth and development of plants.

Furthermore, the HMA manifests itself as a powerful biochemical agent interaction of whose humic-mineral substances with mineral and organic substances of waste products and with native microflora provides efficient detoxication of said products, formation of characteristic coil-building processes involving transformation of originally toxic waste products into nontoxic original technogenous soil and restoring biogeocenosis characteristic of soil. In his case, the microflora non-relevant to soil, e.g., thiobacteries, is suppressed, whereas the growth of the characteristic soil microflora is promoted. The HMA in a mixture with waste products performs all functions of the soil humus, thus ensuring optimum water, air and heat regimes of a technogenous soil, as well as a reasonable regime of plant's nutrition, growth and development. For as much as the HMA is not a fertilizer, the presence of fertilizers therein, largely the nitrogenous ones, reinforces the positive effects thereof. In addition, provision of nitrogen contributes, under natural conditions, the coursing of the processes of humic substance formation.

According to the present invention, badly polluted sewage water is proposed to be treated with the aid of humic-mineral agent.

The process of treatment of sewage water which comprises soluble and insoluble organic, inorganic and micro-biological impurities involves adding thereto, under constant stirring, the aforementioned humic-mineral agent. As a result, ions of heavy metals are bounded with humic acids and humates following the pattern seen in ion exchange to form water-insoluble compounds, adsorption of water-soluble impurities with humic acids and the humic-mineral and mineral (clay) HMA components, and coagulation and flocculation of insoluble impurities.

It is expedient that applying the HMA is followed by adding to sewage water under treatment some quick lime (calcium hydroxide). As a result, humates and water-soluble humic acids react with calcium to form water-insoluble calcium humate which is isolated from the solution as finely dispersed particles. Precipitating calcium humate particles behaves as a volumetric filter bed which filters out water and withdraws the pollutants out therefrom.

The sewage water treated with humic-mineral agent and calcium hydroxide is let to settle, whereupon the water is withdrawn and the sediment is removed and dewatered. The dewatered sediment is incinerated at a minimum temperature of 800° C. because it is at said temperature that humic substances are decomposed without formation of any noxious compounds or toxic gases. The dewatered sediment is then composted to obtain a valuable fertilizer.

According to the present invention, detoxication and salvaging of sewage sediment is proposed to be effected with the aid of HMA.

For detoxication and salvaging of sewage sediment original sediment is mixed together with HMA to form a homogeneous mixture. As a result, humic acids, salts thereof, humic-mineral and mineral HMA components bind ions of heavy metals efficiently to form water-insoluble compounds, sorb organic etotoxicants, such as hydrocarbons of oil and of products thereof, polycyclic and polychlorinated compounds and due to oxidation-hydroxylation reactions expedite the processes of destruction and transformation into specific organic humus-like substances. In the presence of HMA organic substances of the sediment are predominantly humified rather than mineralized. The original HMA and the compounds formed in the course of its interaction with ecotoxicants acts along with humified organic components as a colloidal adhesive, thereby holding together mineral and organic sediment particles and forming therefrom a three-dimensional structure.

Bound ions of heavy metals and strongly sorbed organic toxicants loose ability to migrate, whereby their intake in ground water and penetration into plants are prevented. It is due to said fact that such sewage sediment may be salvaged as reclamation soil for reclaiming dumping areas, waste heaps, spent quarries, and other disturbed lands.

Having relatively high moisture capacity, the HMA retains water in a physically bound and immobilized form, thereby providing additional coalescence of sediment particles by virtue of capillary forces. In combination all mentioned before results in a drastic reduction of the coefficient of water filtration through a bed of such sediment so that said filtration coefficient becomes equal to or below that of clay and loam recommended as insulating soil (which coefficient equals $10^{-3}$ m/day). On that account such sediment may be salvaged as an insulating soil at burial grounds for household garbage and solid industrial waste, and for those equated therewith.

To promote understanding of the present invention, given below are some exemplary embodiments thereof which however place no limitation upon the invention being therein claimed.

EXAMPLE 6

There was carried out detoxication of soil samples taken in the vicinity of the condenser manufacturing works in the city of Serpukhov (Moscow region), said samples being polluted with polychlorinated biphenil (PCB). Soil sample were taken from plowing areas 100×100 m using the "envelope" technique.

Then put in a hothouse to be held there for 60 days at a constant temperature (14° C.) and humidity (70% of a total soil moisture capacity). The HMA dose applied was from 0.1 to 10% in terms of dry matter of a total soil dry weight. Used as the control were soil samples free from the HMA. The HMA application procedure was repeated four times in succession. The starting PCB content was from 0.12 to 300 mg/kg.

It was found that the soil samples featuring low PCB content (0.12 mg/kg on the average) displayed a reduction in said content by 40–50% on the average for 60 days following the treatment with HMA, the most effective reduction of said content was observed in the range of the HMA doses applied from 0.3 to 5%. With the HMA dose above 5% no perceptible difference was noted (except for the effect of "diluting" the soil samples).

It was also found that PCB content (300 mg/kg on the average) said content was found to have dropped by 30–34% for 60 days.

It was noted that with the temperature elevation to 24° C. the soil samples featuring a low PCB content (0.12 mg/kg on the average) after having been held for 60 days at that temperature, displayed a 60–70% reduction in said content, while the soil featuring a high PCB content (300 mg/kg on the average) exhibited a 40\50% reduction in the PCB content for the same period of time.

EXAMPLE 7

As a result of industrial-economical activities, as well as warehousing and burial of domestic and industrial waste, an unfavorable ecological situation has arisen on some land areas consisting mainly in high levels of soil pollution and ground with heavy metals.

Decontamination and detoxication procedures of one of such areas were carried out in Moscow.

To select optimum HMA doses a number of experimental plots were laid on the area subject to decontamination, each plot being equal to 1×1 m. Plot No 1 was given one percent of HMA (in terms of dry matter) of a total soil weight, applied for a depth of 20 cm, plot No2, 1.5% of HMA, plot No 3, 3% of HMA, plot No 4 being the control.

Once HMA has been applied, the plots were dug over again for a depth of 20 cm so that HMA was spread uniformly over the profile of the polluted soil. Each of the plots was irrigated with water (8–10 l/sq.m), whereupon samples for chemical analysis.

In view of the fact that during soil tillage humic acids bind strongly the ions of toxic heavy metals by transforming them into stationary (water-insoluble) forms, the concentrations of metals in a mobile form were assigned for assessing the efficiency of the detoxication procedure performed. The results of the sample analysis are presented in Table 1.

TABLE 1

| Element 1 | Buffer type 2 | Form of element 3 | MAC 4 | No 1 5 | No 2 6 | No 3 7 | No 4 8 |
|---|---|---|---|---|---|---|---|
| Zinc | Ammonium-acetate buffer, pH = 4.8 | Mobile | 23.0 | 14.50 | 10.75 | 7.5 | 18.0 |
| Manganese | Ammonium-acetate buffer, pH = 4.8 | Mobile | 1500 | 7.05 | 6.59 | 5.90 | 7.14 |
| Strontium | Ammonium-acetate buffer, pH = 4.8 | Mobile | | 27.5 | 19.1 | 3.3 | 33.3 |
| Nickel | Ammonium-acetate buffer, pH = 4.8 | Mobile | 4.0 | 8.0 | 3.6 | 2.2 | 10.0 |
| Cobalt | Ammonium-sodium buffer, pH = 3.5 | Mobile | 5.0 | 8.2 | 4.0 | 2.1 | 8.3 |
| Chromium | Ammonium-acetate buffer, pH = 4.8 | Mobile | 6.0 | 16.0 | 5.0 | 3.5 | 21.0 |
| Copper | Ammonium-acetate buffer, pH = 4.8 | Mobile | 3.0 | 4.0 | 2.5 | 2.0 | 5.0 |
| Lead | Ammonium-acetate buffer, pH = 4.8 | Bulk | 30.0 | 33.0 | 22.5 | 10.3 | 35.0 |
| Arsenic | Ammonium-acetate buffer, pH = 4.8 | Bulk | 2.0 | 10.0 | 1.6 | 0.5 | 14.0 |
| Vanadium | Ammonium-acetate buffer, pH = 4.8 | Bulk | 150.0 | 6.6 | 5.0 | 3.9 | 7.6 |
| Antimony | Ammonium-acetate buffer, pH = 4.8 | Bulk | 4.5 | 0.50 | 0.42 | 0.33 | 0.52 |
| Silver | Ammonium-acetate buffer, pH = 4.8 | Bulk | | 0.42 | 0.30 | 0.24 | 0.47 |
| Tin | Ammonium-acetate buffer, pH = 4.8 | Bulk | | 12.0 | 8.0 | 6.5 | 15.0 |
| Cadmium | Ammonium-acetate buffer, pH = 4.8 | Bulk | | 1.01 | 0.83 | 0.48 | 1.02 |

As is evident from Table 1, the MAC values assigned for soil are attainable with a HMA application dose of about 1.5%. As a result, the content of heavy metals capable of migrating into water medium and plants drastically diminishes. For an optimum HMA dose equal to 1.5% a land having an area of 1.8 ha was subjected to detoxication. Soil samples were taken before and after the detoxication procedure using the HMA. Efficiency of the detoxication procedure is presented in Table 2.

TABLE 2

| Element | Mean concentration before detoxication, mg/kg | Mean concentration after detoxication, mg/kg | Efficiency, percent |
|---|---|---|---|
| Zinc | 25 | 10.1 | 60% |
| Manganese | 7.7 | 6.24 | 19% |
| Strontium | 45.6 | 5.78 | 87% |
| Nickel | 9.6 | 2.7 | 72% |
| Cobalt | 9.3 | 3.66 | 61% |
| Chromium | 23.7 | 5.38 | 77% |
| Copper | 4.3 | 2.46 | 43% |
| Lead | 34.8 | 9.32 | 73% |
| Arsenic | 12 | 1.76 | 85% |
| Vanadium | 8.4 | 6.18 | 26% |
| Antimony | 0.7 | 0.268 | 62% |
| Tin | 12.2 | 5.28 | 57% |
| Cadmium | 0.99 | 0.338 | 66% |

Analysis of the experimental evidence obtained from detoxication treatment of the polluted area enables one to conclude about a good efficiency of the soil detoxication procedure performed:
content of mobile forms of cadmium, nickel and arsenic is reduced 5–6 times;
content of mobile forms of chromium and strontium is reduced 4 times;
content of mobile forms of lead, silver, tin and cobalt is reduced 3 times;
content of mobile forms of zinc and copper is reduced twice, that of vanadium and antimony, 1.5 times.
In addition, content of manganese, strontium, zinc, copper, lead, cadmium, nickel, chromium, arsenic, silver, vanadium, antimony and tin in all soil samples taken after detoxication procedure are much below the MAC level.

EXAMPLE 8

There was performed detoxication of samples of copper ore dressing rejects available from "Asarel-Medet" integrated ore-dressing plant (Bulgaria), said samples being taken from the "oxide" dump (samples No10) and from the "eastern" bank (samples No2).

An average copper content of sample No1 was 500 mg/kg with the pH value of 3.7, that of sample No2 was 700 mg/kg, the pH value being 3.5.

Acid reaction of the samples was neutralized by adding hydrated lime. It is found that an increase in pH value of the samples from 3.5–3.7 to virtually neutral pH values equal to 7.8–8.5 have been attained with a lime dose approximately equal to 0.4% in terms of dry matter of a total dry weight of samples. However, as times went by, the pH of the lime-treated samples dropped down drastically. Thus, for instance, the pH value of lime-treated sample No1 was found to have dropped from 8.5 to 6.2 for 21 days and that of sample No2, from, 8.2 to 4.2 for the same period of time.

It is also found that when neutralizing the acid reaction of the samples by adding hydrated lime thereto in an amount of 0.4% (in terms of dry matter) and bringing the pH value of said samples to 7.5–8.5 is followed by adding HMA thereto in an amount of from 0.15 to 12%, much lower reduction in the pH values is observed. Moreover, with the HMA content within 10%, the higher the HMA content of the samples the lower the pH reduction therein. Thus, for instance, with the HMA content of 0.15% in terms of dry matter of a total dry weight of samples #1 the pH value is found to have dropped from 8.5 to 6.2 for 21 days; with the HMA content of 1.5% the pH value decreased from 8.5 to 7.6, and with the HMA content of 3% the pH value decreased from 8.9 to 7.8. However, with the HMA content of 10% and over no further changes in the pH value were observed.

The efficiency of detoxication of the waste products represented by samples No 1 and No 2 was studied upon adding hydrated lime thereto (0.4% of the sample weight), as well as hydrated lime (~0.4% and the HMA in an amount of from 0.15 to 10%. A toxic effect of the waste products on the growth and development of plants before and after adding hydrated lime and lime along with the HMA thereto was conducted in keeping with ISO Standard 11269-2. It was determined also a change in the species composition of microorganisms following adding lime and the HMA. The results of said studies including plant germination precentage (exemplified by barley), average plant height and biomass are given in Table 3.

TABLE 3

| Nos | Test variants | Seed germinating capacity, percent of total amount of seeds sowed | Percent of control | Average height of plant, percent of control | Average dry biomass, percent of control |
|---|---|---|---|---|---|
| 1 | 2 | 3 | 4 | 5 | 6 |
| 1 | Original sample No 1 (control) | 32.6 | 100 | 100 | 100 |
| 2 | Sample No 1 + 0.4% of lime | 68.5 | 210 | 186 | 260 |
| 3 | Sample No 1 + 0.4% of lime + 0.75% of GM | 100 | 306 | 339 | 395 |
| 4 | Sample No 1 + 0.4% of lime + 1.5% of GM | 100 | 306 | 390 | 450 |
| 5 | Sample No 1 + 0.4% of lime + 3% of HMA | 100 | 306 | 410 | 563 |
| 6 | Original sample No 2 | 0 | 0 | 0 | 0 |
| 7 | Sample No 2 + 0.4% of lime (control) | 21.4 | 100 | 100 | 100 |

TABLE 3-continued

| Nos 1 | Test variants 2 | Seed germinating capacity, percent of total amount of seeds sowed 3 | Percent of control 4 | Average height of plant, percent of control 5 | Average dry biomass, percent of control 6 |
|---|---|---|---|---|---|
| 8 | Sample No 2 + 0.4% of lime + 0.75% of HMA | 75.0 | 350 | 171 | 160 |
| 9 | Sample No 2 + 0.4% of lime + 1.5% of HMA | 85.4 | 399 | 163 | 180 |
| 10 | Sample No 2 + 0.4% of lime + 3% of HMA | 100 | 467 | 211 | 220 |

Note. Table 3 contains data for a HMA application dose of 0.75, 1.5 and 3%. With said dose ranging from 0.15 to 1.5% there is observed a gradual increase in waste detoxication efficiency which reaches maximum values with HMA doses from 0.75 to 10%. The exposure time is 21 days (till the stage of second leaf).

As is can be seen from Table 3, it is the waste of sample #2 that proves to be most toxic so that seeds fail to germinate thereon. Lime application reduces toxicity but partially. By that reason the seventh test variant involving lime application is adopted for samples #2 as the control.

Active microflora of the samples was studied both before and after lime and HMA application.

Preliminarily a 1 g dose of a soddy-podzolic soil suspension was applied to all samples as a carrier of typical soil microorganisms. A great many sulfur bacteria of *Thiobacillus ferooxidans* and *Leptospirillum ferooxidans* genera was detected in the original (untreated) samples. No active forms of said sulfur bacteria are found after treatment thereof.

EXAMPLE 9

There was performed detoxication of waste products from hydrometallurgical (electrolysis) zinc production (Brazil).

Waste products result from roasting zinc concentrate, leaching of zinc from cinder with sulfuric acid solutions, electrolysis zinc isolation, thickening and cake dewatering, and its neutralizing with lime. The waste appears as a dispersed mass colored red-brown. An average zinc content of the waste was 1470 mg/kg, that of aluminum, 64 mg/kg; cadmium, 9 mg/kg; nickel, 0.8 mg/kg; copper, 0.5 mg/kg; and lead, 0.4 mg/kg, with an actual pH value ranging from 6.2 to 6.5.

Different amounts of the HMA were applied to the original waste samples: 0.15%, 0.5%, 1.5%, 3%, 6%, 8%, and 10% of a total dry weight of sample waste. Used as the control was a waste sample free from the HMA. Detoxication efficiency was determined by a biotesting method as per international standard ISO 11269-2. Used as a test culture was barley, each variant being repeated four times.

It is found that no seed germination has virtually occurred in the control samples, that is, scarcely having appeared the germs perished rapidly. Beginning with the dose of 0.15% there appeared stable sprouts which however, developed rather slowly. As the HMA content of the samples increases, the plants developed quicker. Table 4 presents the results of the HMA effect on growth of plants.

TABLE 4

| Nos | Test variants | Average plant height, cm | Average plant height, percent of variant No2 |
|---|---|---|---|
| 1 | 2 | 3 | 4 |
| 1 | Control | 0 | 0 |
| 2 | Waste + 0.15% of HMA | 7.4 | 100 |
| 3 | Waste + 0.5% of HMA | 9.6 | 129.7 |
| 4 | Waste + 1.5% of HMA | 10.6 | 143.2 |
| 5 | Waste + 3.% of HMA | 11.6 | 156.7 |

The biometric data of Table 4 agree well with such an important agrochemical and biological index as gain in plant biomass.

Table 5 contains the results of the HMA effect on gain in ground biomass of plants (in terms of dry biomass).

TABLE 5

| Nos | Test variants | Average plant mass, g/vessel | Average plant mass % of variant No 2 |
|---|---|---|---|
| 1 | Control | 0 | 0 |
| 2 | Waste + 0.15% of HMA | 0.41 | 100.0 |
| 3 | Waste + 0.15% of HMA | 0.52 | 126.8 |
| 4 | Waste + 0.15% of HMA | 0.59 | 143.9 |
| 5 | Waste + 0.15% of HMA | 0.69 | 168.2 |

The positive results thus obtained are accounted for by both the effects of waste detoxication due to binding the ions of zinc and other heavy metals and the effects of biostimulating and protective action of the HMA on plants.

Apart from a considerable reduction in or elimination of waste toxicity, the HMA additives improve much physical waste properties and acquire valuable agronomic qualities thereto, thus rendering waste products into primary fertile soil which ensures normal plant growth and development. Moreover, there are formed such properties characteristic of normal prolific soil as absorbing capacity, buffering, moisture capacity, ability to structurize, that is, waste products treated with the HMA may be classify as soil. In addition, as the HMA dose increases to 8–10% and over, waste acquires still more and more the quality of primary fertile highly humus-incorporated soil.

Processes of tail pit reclamation were simulated on a special table simulator appearing as a rectangular duct measuring 0.5×0.75 m and 0.35 m deep. The duct was filled with waste products and the latter were compacted. Once having been held for a two-week period the waste products were loosened for a depth of 0.2 m and the HMA in a dose of 3$ was applied thereto.

It is found that the principal physical-chemical processes have been stabilized within 7–14 days following the HMA application. In a two-week period grass seeds were sowed. An effective grass growth and development, good condition of its root system and forming main biogeochemical processes characteristic of soil were found by way of observation.

EXAMPLE 10

There were carried out treatment of manure discharges of the pig-breeding complex "Krasny Luch" (Moscow region). Manure discharges are formed as a result of hydraulically mechanized disposal of pig manure and appear as a dark-green liquid with fodder admixture and a characteristic objectionable odor.

Delivery of such discharges, after having kept them in quarantine, to mechanical-biological treatment plants results to failure of the biological part thereof due du high toxicity of the discharges. On that account the aim was to subject the discharges to pretreatment and bring them to a level making possible subsequent biological aftertreatment.

The samples of the original discharge liquid were doped with the HMA added under constant steering, whereupon same samples were given lime in the form of lime milk and were let to settle.

Preliminary proximate analyses comprising determining transparency, color, odor, and amount of suspended matter demonstrated that treatment of such discharges starts proceeding when the HMA concentration was in the range of from 1 to 7& (in terms of dry matter) and that of lime, from 0.3 to 1.5% (in terms of dry matter). After having been treated the water became transparent with a barely perceptible yellowish hue and scarcely distinguishable odor.

For a specific amount of an original discharge liquid having a chemical oxygen consumption (COC) rate of 1440 mg/l, adding the HMA in an amount of 1.5% and lime in an amount of 0.5% (of a total weight of discharge liquid) ensured obtaining a transparent liquid virtually odorless and with the COC rate of about 160 mg/l. Afterwards the thus obtained liquid was efficiently purified till the COC rate of 12–18 mg/l in the biological part of the treatment plants.

EXAMPLE 11

There was effected treatment of filtrate, that is, discharge liquid flowing out of the body of a burial ground Salarievo (Moscow region).

As it has been established by pretesting, a most efficient treatment is liable to occur when the HMA concentration was in the range of from 1 to 7& (in terms of dry matter) and that of lime, from 0.3 to 1.5% (in terms of dry matter) of a total filtrate weight. The characteristics of the original filtrate and of that treated with the 1% HMA dose and the 0.3% lime dose are given in Table 6.

TABLE 6

| Impurities 1 | Original filtrate 2 | Treated filtrate 3 | MAC for sewage disposal 4 |
|---|---|---|---|
| Chemical oxygen consumption, mg/l | 1220 | 48 | 800 |

TABLE 6-continued

| Impurities 1 | Original filtrate 2 | Treated filtrate 3 | MAC for sewage disposal 4 |
|---|---|---|---|
| Biological oxygen consumption, mg/l | 80.6 | 6.9 | 500 |
| Total microbial count, kg/ml | Confluent growth | 100 | — |
| Suspended matter. Mg/l | 80 | 24 | — |
| Oil products, mg/l | 12.8 | 3.2 | 4 |
| Manganese, mg/l | 2.8 | 0.16 | 2 |
| Zinc, mg/l | 6.2 | 1.2 | 2 |
| Copper, mg/l | 0.62 | 0.44 | 0.5 |
| Lead, mg/l | 0.18 | 0.09 | 0.1 |
| Cadmium, mg/l | 0.014 | 0.003 | 0.01 |
| Nickel, mg/l | 0.45 | 0.1 | 0.5 |
| Chromium, mg/l | 0.805 | 0.08 | 1.1 |
| Cobalt, mg/l | 0.3 | 0.08 | 0.3 |
| Arsenic, mg/l | 0.08 | 0.02 | 0.05 |
| Mercury, mg/l | 0.006 | 0.0003 | 0.005 |

EXAMPLE 12

Establishing reclamation layers on the surface of burial grounds for domestic garbage and solid industrial waste in mine out space of open-cut mines and collieries, as well as other disturbed lands is now an important and urgent problem. It is due to deficiency of natural soil and grounds that used as reclamation undersoil may be municipal sewage sediment (MSS). Reasons for limitation of such MSS salvaging lie with their dusting resulting from MSS drying, as well high levels of content of heavy metals and other toxicants therein.

It is found by laboratory tests that when dry MSS start dusting at an air stream velocity of 1.5–2 m/s, the dusting decreases drastically upon adding the HMA thereto. Hence It is even at an adequately low HMA content of MSS (approximately 0.1–0.15%) that the dusting threshold is increased twice or thrice, that is MSS starts dusting at an air stream velocity of 3–6 m/s. With the HMA content of about 1% the dusting threshold increases up to 12–15 m/s. Once MSS has been mixed together with the HMA, the properties and structure of both experience substantial changes. Thus, treated MSS becomes, as a matter of fact, normal soil.

The resultant layer of such soil was laid over the surface of the burial ground body, whereupon seeds of lupine and barley were sowed. Ripening of the plants was followed by determining the content of heavy metals thereof (cf. Table 7).

TABLE 7

| | Content of heavy metals, mg/kg | | | | | |
|---|---|---|---|---|---|---|
| | Cd | | Zn | | Cu | |
| Test variants | MSS | MSS + 1% HMA | MSS | MSS + 1% HMA | MSS | MSS + 1% HMA |
| Lupine (straw) | 0.87 | 0.26 | 1.8 | 0.9 | 2.4 | 0.9 |
| Barley (straw) | 1.28 | 0.96 | 1.15 | 0.68 | 2.8 | 1.2 |

As is evident from Table 7, intake of heavy metals by the plants is drastically reduced after MSS treatment with the HMA which is indicative of efficient binding of said metals and loss of mobility thereby.

EXAMPLE 13

Mechanically dewatered sewage sediment was mixed together with the HMA taken in an amount of from 0.1 to 10%. Once treated MSS was put in trays measuring 0.5×0.75 m each and 0.35 mm deep. Then a filtration factor was determined after a steady-state water discharge, by a method of water poring into a test pit using instruments by A. K. Boldyrev and G. N. Kamenski.

It has been found that the filtration factor of treated MSS close to that of clay and compact loam ($3\times10^{-4}$ m/day) is liable to occur with a minimum HMA content of from 1 to 3%, that is, with the HMA content of MSS at a level of 1–3% such MSS may be salvaged instead of clay and compact loam as isolating soil.

In view of checking untreated and treated MSS for resistance to microbiological destruction, MSS were laid as a layer 0.3 m thick into the body of disposal dump for a depth of 2.5 m. A measure of assessment of humic acid content of original (untreated) MSS and that of treated with the HMA after their having been held for two-year period in the body of the disposal dump. The content of humic acids was determined against their yield using a standard technique.

It is found that the content of humine-like substances in original MSS is about 0.4%, while said content in untreated HMA after a two-year period was 1.6%. The humic acid content of MSS treated with the HMA after said period of time was 18%. Hence treatment of MSS with said agent results in predominant humification (synthesis) rather than in mineralization (decomposition) of organic matter in MSS, whereby MSS treated with HMA become more valuable as isolating soil.

INDUSTRIAL APPLICABILITY

The invention can find application in engineering (industrial) ecology for detoxication and treatment of soil and lands polluted with organic and inorganic ecotoxicants; for reclamation of disturbed lands, industrial dumping areas and refuse tips; in municipal communal services for sewage treatment and salvaging sewage sediment, as well as for soil reclamation and increasing fertility thereof.

The invention claimed is:

1. A method for preparing a humic-mineral agent, comprising the steps of:
   providing a humic acid-containing material having a total weight and a moisture content between 20% and 45%, said humic acid-containing material taken from the group consisting of peat and coal;
   crushing said humic acid-containing material;
   mixing said crushed humic acid-containing material with a quantity of water to form a homogenous mixture, wherein the weight of said quantity of water is not greater than the total weight of said humic acid-containing material; and
   adding an alkali to said homogenous mixture to form a humic-mineral agent, wherein said alkali is added to said mixture in an amount from about 1% to 7.5% of the dry weight of said humic acid-containing material, wherein the dry weight is the total weight minus the moisture content.

2. A method for preparing a humic-mineral agent as recited in claim 1, wherein the weight of said quantity of water is greater than or equal to 0.1 times the total weight of said humic acid-containing material.

3. A method for preparing a humic-mineral agent as recited in claim 1, wherein the weight of the quantity of water is determined by the following formula:

$$m_w = \frac{(W_d - W_o)m_y}{(1 - W_d)}$$

where $m_w$=weight of water
   $m_y$=weight of natural sample having a moisture content between 0.20 and 0.45
   $W_o$=measured moisture content of sample (between 0.20 and 0.45)
   $W_d$=desired moisture content of between 0.5 and 0.6.

4. A method for preparing a humic-mineral agent as recited in claim 3, wherein said alkali is added to said mixture until the resulting humic-mineral agent has a consistency from viscous-flow to plastic and a pH between 6.5 and 8.

5. A method for preparing a humic-mineral agent as recited in claim 3, wherein said crushed humic acid-containing material is mixed with water by adding said mixture to water at approximately 95 degrees Celsius under vigorous stirring.

6. A method for preparing a humic-mineral agent as recited in claim 3, wherein said alkali is chosen from the group consisting of sodium hydroxide, potassium hydroxide, a mixture of sodium hydroxide and potassium hydroxide, and an ammonia solution.

7. A method for preparing a humic-mineral agent as recited in claim 3, and further comprising the step of:
   doping said humic-mineral agent with a nitrogen-bearing substance, wherein said nitrogen-bearing substance is chosen from the group consisting of ammonium nitrate, carbamide and ammonium sulfate.

8. A method for preparing a humic-mineral agent, as recited in claim 7, wherein the nitrogen-bearing substance is added in an amount not greater than 5% of the dry weight of said humic acid-containing material.

9. A method for preparing a humic-mineral agent as recited in claim 3 wherein said humic acid-containing material includes at least 25% humic acids, as measured by Russian Standard GOST 9517-76.

10. A method for preparing a humic-mineral agent as recited in claim 9, wherein said humic acid-containing material includes less than 30% mineral components and less than 40% volatiles on a weight percent basis.

11. A method for preparing a humic-mineral agent as recited in claim 10, wherein said humic acid-containing material includes less than the maximum allowable concentration of heavy metals specified for soil, specifically:
   the concentration of zinc is less than 23 mg/kg;
   the concentration of manganese is less than 1500 mg/kg;
   the concentration of nickel is less than 4 mg/kg;
   the concentration of cobalt is less than 5 mg/kg;
   the concentration of chromium is less than 6 mg/kg;
   the concentration of lead is less than 30 mg/kg;
   the concentration of arsenic is less than 2 mg/kg;
   the concentration of vanadium is less than 150 mg/kg; and
   the concentration of antimony is less than 4.5 mg/kg.

12. A humic-mineral agent prepared by the process of:
   providing a humic acid-containing material having a total weight and a moisture content between 20% and 45%, said humic acid-containing material taken from the group consisting of peat and coal;
   crushing said humic acid-containing material;

mixing said crushed humic acid-containing material with a quantity of water to form a homogenous mixture, wherein the weight of said quantity of water is not greater than the total weight of said humic acid-containing material; and adding an alkali to said homogenous mixture to form a humic-mineral agent, wherein said alkali is added to said mixture in an amount from about 1% to 7.5% of the dry weight of said humic acid-containing material, wherein the dry weight is the total weight minus the moisture content.

13. A humic-mineral agent as recited in claim 12, wherein said humic acid-containing material includes at least 25% humic acids, as measured by Russian Standard GOST 9517-76, and includes less than 30% mineral components and less than 40% volatiles on a weight percent basis; said water is at approximately 95 degrees Celsius; the weight of said quantity of water is determined by the following formula:

$$m_w = \frac{(W_d - W_o)m_y}{(1 - W_d)}$$

where $m_w$=weight of water $m_y$=weight of natural sample having a moisture content between 0.20 and 0.45

$W_o$=measured moisture content of sample (between 0.20 and 0.45)

$W_d$=desired moisture content of between 0.5 and 0.6; and wherein said alkali is chosen from the group consisting of sodium hydroxide, potassium hydroxide, a mixture of sodium hydroxide and potassium hydroxide, and an ammonia solution.

14. A method for detoxification of a toxic material, comprising the steps of:

preparing a humic-mineral agent by:
providing a humic acid-containing material having a total weight and a moisture content between 20% and 45%, said humic acid-containing material taken from the group consisting of peat and coal;
crushing said humic acid-containing material;
mixing said crushed humic acid-containing material with a quantity of water to form a homogenous mixture, wherein the weight of said quantity of water is not greater than the total weight of said humic acid-containing material; and
adding an alkali to said homogenous mixture to form a humic-mineral agent, wherein said alkali is added to said mixture in an amount from about 1% to 7.5% of the dry weight of said humic acid-containing material, wherein the dry weight is the total weight minus the moisture content;

applying said humic-mineral agent to toxic material; and
mixing said humic-mineral agent together with the toxic material.

15. A method for detoxification of a toxic material as recited in claim 14, wherein said toxic material is soil and said humic mineral agent is added in an amount from about 0.1% to 5% of the weight of the soil.

16. A method for detoxification of a toxic material as recited in claim 14, wherein said toxic material is waste product from mining, and said humic-mineral agent is added in an amount from about 0.1% to 5% of the weight of the waste product.

17. A method for detoxification of a toxic material as recited in claim 14, wherein said toxic material is waste product from mineral processing, and said humic-mineral agent is added in an amount from about 0.1% to 5% of the weight of the waste product.

18. A method for detoxification of a toxic material as recited in claim 14, wherein said toxic material is sewage water, and said humic-mineral agent is added in an amount from about 1% to 7% of the weight of the sewage water.

19. A method for detoxification of a toxic material as recited in claim 18, and further comprising the step of adding lime in an amount of from about 0.3% to 1.5% of the weight of the sewage water.

20. A method for detoxification of a toxic material as recited in claim 14, wherein said toxic material is sewage sediment, and said humic-mineral agent is added in an amount from about 0.1% to 10% of the sediment weight.

* * * * *

UNITED STATES PATENT AND TRADEMARK OFFICE
CERTIFICATE OF CORRECTION

PATENT NO. : 7,204,660 B2 Page 1 of 1
APPLICATION NO. : 10/536208
DATED : April 17, 2007
INVENTOR(S) : Alexander Ivanovich Shulgin and Alexandrovich Shulgin It is certified that error appears in the above-identified patent and that said Letters Patent is hereby corrected as shown below:

Column 23, line 22, delete "due du" and insert therefor --due to--.
Column 25, line 27, delete "HMA" and insert therefor --MSS--.

Signed and Sealed this

Seventh Day of August, 2007

JON W. DUDAS
*Director of the United States Patent and Trademark Office*